(12) United States Patent
Peleg et al.

(10) Patent No.: US 8,873,816 B1
(45) Date of Patent: Oct. 28, 2014

(54) METHOD AND SYSTEM FOR IDENTIFICATION OF RED COLORED PATHOLOGIES IN VIVO

(75) Inventors: Dori Peleg, Haifa (IL); Eli Horn, Kiryat Motzkin (IL)

(73) Assignee: Given Imaging Ltd., Yoqneam (IL)

( * ) Notice: Subject to any disclaimer, the term of this patent is extended or adjusted under 35 U.S.C. 154(b) by 280 days.

(21) Appl. No.: 13/441,130

(22) Filed: Apr. 6, 2012

Related U.S. Application Data (60) Provisional application No. 61/472,453, filed on Apr. 6, 2011.

(51) Int. Cl.
    *G06K 9/00* (2006.01)

(52) U.S. Cl.
    USPC ........................................................ 382/128

(58) Field of Classification Search
    None
    See application file for complete search history.

(56) References Cited

U.S. PATENT DOCUMENTS

| | | | |
|---|---|---|---|
| 3,683,389 A | 8/1972 | Hollis | |
| 3,909,792 A | 9/1975 | Harris et al. | |
| 3,971,362 A | 7/1976 | Pope et al. | |
| 4,017,261 A | 4/1977 | Svoboda et al. | |
| 4,278,077 A | 7/1981 | Mizumoto | |
| 4,337,222 A | 6/1982 | Kitajima et al. | |
| 4,646,724 A | 3/1987 | Sato et al. | |
| 4,689,621 A | 8/1987 | Kleinberg | |
| 4,698,664 A | 10/1987 | Nichols et al. | |
| 4,741,327 A | 5/1988 | Yabe | |
| 4,844,076 A | 7/1989 | Lesho et al. | |
| 4,907,095 A | 3/1990 | Komura et al. | |
| 4,920,045 A | 4/1990 | Okuda et al. | |
| 4,936,823 A | 6/1990 | Colvin et al. | |
| 5,042,494 A | 8/1991 | Alfano | |
| 5,187,572 A | 2/1993 | Nakamura et al. | |
| 5,212,637 A * | 5/1993 | Saxena .......................... | 600/407 |
| 5,267,033 A | 11/1993 | Hoshino | |

(Continued)

FOREIGN PATENT DOCUMENTS

| | | |
|---|---|---|
| DE | 3440177 | 5/1986 |
| EP | 1618832 | 1/2006 |

(Continued)

OTHER PUBLICATIONS

Rowlands et al. "The Radio Pill", British Communications and Electronics, Aug. 1960, pp. 598-601.

(Continued)

*Primary Examiner* — Stephen R Koziol
*Assistant Examiner* — Raphael Schwartz
(74) *Attorney, Agent, or Firm* — Pearl Cohen Zedek Latzer Baratz LLP (57) ABSTRACT

A system and method may identify pathologies such as red pathologies in in-vivo images. Candidate pathology regions may be identified by identifying red regions. Features indicative of the probability of pathology in candidate regions may be identified. An image score for an image may be identified based on one or more identified features, the image score indicative of existence in the image of at least one candidate region with high probability of pathology. Calculating an image score may include calculating a candidate score for at least one identified candidate region based on features, the candidate score indicative of the probability of pathology being imaged in said candidate region, where the image score corresponds to the candidate score of the candidate region with the highest probability of pathology in the image.

21 Claims, 7 Drawing Sheets

(56) References Cited

U.S. PATENT DOCUMENTS

| | | | |
|---|---|---|---|
| 5,279,607 A | 1/1994 | Schentag et al. | |
| 5,333,244 A | 7/1994 | Harashima | |
| 5,392,072 A | 2/1995 | Rodriguez et al. | |
| 5,494,032 A | 2/1996 | Robinson et al. | |
| 5,495,114 A | 2/1996 | Adair | |
| 5,519,828 A | 5/1996 | Rayner | |
| 5,566,169 A | 10/1996 | Rangan et al. | |
| 5,604,531 A | 2/1997 | Iddan et al. | |
| 5,605,153 A | 2/1997 | Fujioka et al. | |
| 5,697,384 A | 12/1997 | Miyawaki et al. | |
| 5,697,885 A | 12/1997 | Konomura et al. | |
| 5,726,670 A | 3/1998 | Tabata et al. | |
| 5,819,736 A | 10/1998 | Avny et al. | |
| 5,827,190 A | 10/1998 | Palcic et al. | |
| 5,830,141 A | 11/1998 | Makram-Ebeid et al. | |
| 5,833,603 A | 11/1998 | Kovacs et al. | |
| 5,880,777 A | 3/1999 | Savoye et al. | |
| 5,886,353 A | 3/1999 | Spivey et al. | |
| 5,929,901 A | 7/1999 | Adair et al. | |
| 5,970,173 A | 10/1999 | Lee et al. | |
| 5,986,693 A | 11/1999 | Adair et al. | |
| 5,993,378 A | 11/1999 | Lemelson | |
| 6,043,839 A | 3/2000 | Adair et al. | |
| 6,095,989 A | 8/2000 | Hay et al. | |
| 6,097,399 A | 8/2000 | Bhatt et al. | |
| 6,106,457 A | 8/2000 | Perkins et al. | |
| 6,117,529 A | 9/2000 | Leising et al. | |
| 6,166,496 A | 12/2000 | Lys et al. | |
| 6,188,403 B1 | 2/2001 | Sacerdoti et al. | |
| 6,222,547 B1 | 4/2001 | Schwuttke et al. | |
| 6,240,312 B1 | 5/2001 | Alfano et al. | |
| 6,289,165 B1 | 9/2001 | Abecssis | |
| 6,335,736 B1 | 1/2002 | Wagner et al. | |
| 6,339,446 B1 | 1/2002 | Miyoshi | |
| 6,428,469 B1 | 8/2002 | Iddan et al. | |
| 6,459,919 B1 | 10/2002 | Lys et al. | |
| 6,504,990 B1 | 1/2003 | Abecassis | |
| 6,614,452 B1 | 9/2003 | Cable | |
| 6,632,175 B1 | 10/2003 | Marshall | |
| 6,709,387 B1 | 3/2004 | Glukhovsky et al. | |
| 6,757,412 B1 | 6/2004 | Parsons et al. | |
| 6,791,601 B1 | 9/2004 | Chang et al. | |
| 6,904,308 B2 | 6/2005 | Frisch et al. | |
| 6,944,316 B2 | 9/2005 | Glukhovsky et al. | |
| 6,976,229 B1 | 12/2005 | Balabanovic et al. | |
| 6,984,205 B2 | 1/2006 | Gazdzinski | |
| 7,009,634 B2 | 3/2006 | Iddan et al. | |
| 7,039,453 B2 | 5/2006 | Mullick et al. | |
| 7,119,814 B2 | 10/2006 | Meron et al. | |
| 7,215,338 B2 | 5/2007 | Horn et al. | |
| 7,219,034 B2 | 5/2007 | McGee et al. | |
| 7,245,746 B2 | 7/2007 | Bjaerum et al. | |
| 7,260,777 B2 | 8/2007 | Fitzsimons et al. | |
| 7,272,657 B2 | 9/2007 | Allen et al. | |
| 7,319,781 B2 | 1/2008 | Chen et al. | |
| 7,324,673 B1 | 1/2008 | Yamanaka et al. | |
| 7,452,328 B2 | 11/2008 | Homan et al. | |
| 7,567,692 B2 * | 7/2009 | Buzaglo et al. | 382/128 |
| 7,636,092 B2 | 12/2009 | Horn et al. | |
| 7,694,320 B1 | 4/2010 | Yeo et al. | |
| 7,986,337 B2 | 7/2011 | Davidson et al. | |
| 8,144,152 B2 | 3/2012 | Horn et al. | |
| 2002/0042562 A1 | 4/2002 | Meron et al. | |
| 2002/0140861 A1 | 10/2002 | Janevski et al. | |
| 2002/0177779 A1 | 11/2002 | Adler et al. | |
| 2002/0186234 A1 | 12/2002 | Van de Streek et al. | |
| 2002/0193669 A1 | 12/2002 | Glukhovsky | |
| 2003/0063130 A1 | 4/2003 | Barbieri et al. | |
| 2003/0086596 A1 | 5/2003 | Hipp et al. | |
| 2003/0151661 A1 | 8/2003 | Davidson et al. | |
| 2003/0174208 A1 | 9/2003 | Glukhuvsky et al. | |
| 2003/0223627 A1 * | 12/2003 | Yoshida et al. | 382/128 |
| 2004/0027500 A1 | 2/2004 | Davidson et al. | |
| 2004/0066398 A1 | 4/2004 | Dolimier et al. | |
| 2004/0184639 A1 | 9/2004 | Jackson et al. | |
| 2004/0196287 A1 | 10/2004 | Wong et al. | |
| 2004/0225223 A1 * | 11/2004 | Honda et al. | 600/476 |
| 2004/0249291 A1 | 12/2004 | Honda et al. | |
| 2004/0257620 A1 | 12/2004 | Loce et al. | |
| 2005/0007551 A1 | 1/2005 | Wakil et al. | |
| 2005/0065421 A1 | 3/2005 | Burckhardt | |
| 2005/0152588 A1 * | 7/2005 | Yoshida et al. | 382/128 |
| 2005/0259854 A1 * | 11/2005 | Arimura et al. | 382/130 |
| 2005/0281446 A1 | 12/2005 | Glukhovsky et al. | |
| 2006/0074275 A1 | 4/2006 | Davidson et al. | |
| 2006/0187300 A1 | 8/2006 | Davidson | |
| 2007/0078335 A1 * | 4/2007 | Horn | 600/425 |
| 2007/0159483 A1 | 7/2007 | Horn et al. | |
| 2009/0135250 A1 | 5/2009 | Davidson et al. | |
| 2010/0053313 A1 | 3/2010 | Horn et al. | |
| 2010/0183210 A1 * | 7/2010 | Van Uitert et al. | 382/131 |
| 2010/0189326 A1 * | 7/2010 | McGinnis et al. | 382/131 |
| 2011/0033094 A1 * | 2/2011 | Zarkh et al. | 382/128 |
| 2011/0206250 A1 * | 8/2011 | McGinnis et al. | 382/128 |
| 2011/0243523 A1 | 10/2011 | Davidson et al. | |
| 2012/0139936 A1 | 6/2012 | Horn et al. | |

FOREIGN PATENT DOCUMENTS

| | | |
|---|---|---|
| JP | 57-45833 | 3/1982 |
| JP | 4109927 | 4/1992 |
| JP | 5015515 | 1/1993 |
| JP | 6142081 | 5/1994 |
| JP | 10112835 | 4/1998 |
| JP | 2000/047651 | 2/2000 |
| JP | 2001/37718 | 2/2001 |
| JP | 2003/122805 | 4/2003 |
| JP | 2004/120367 | 4/2004 |
| JP | 2004/521662 | 7/2004 |
| JP | 2004/321603 | 11/2004 |
| JP | 2004-337596 | 12/2004 |
| JP | 2004/337596 | 12/2004 |
| WO | WO 97/33513 | 9/1997 |
| WO | WO 99/40587 | 8/1999 |
| WO | WO 99/60353 | 11/1999 |
| WO | WO 00/22975 | 4/2000 |
| WO | WO 00/58967 | 10/2000 |
| WO | WO 01/06926 | 2/2001 |
| WO | WO 01/65995 | 9/2001 |
| WO | WO 02/26103 | 4/2002 |
| WO | WO 02/073507 | 9/2002 |
| WO | WO 02/102221 | 12/2002 |
| WO | WO 02/102223 | 12/2002 |

OTHER PUBLICATIONS

Video Camera to "TAKE"—RF System Lab, Dec. 25, 2001.

Crum A. "Wellesley Company Sends Body Montiors into Space" Boston Business Journal, Apr. 1998.

Swain et al. "Wireless Transmission of a color television moving image from the stomach using a miniature CCD camera, light source and microwave transmitter" Gastrointest Endosc, 45:AB40, 1997.

BBC News Online—"Pill Camera to 'Broadcast from the Gut'" www.news.bbc.co.uk, Feb. 21, 2000.

Davis E.R "Machine Vision: Theory, Algorithms, Practicalities" $3^{rd}$ Edition, Sep. 2005.

Tagare et al. "Non-Lambertian Shading and Photometric Stereo" SPIE vol. 1260 Sensing and Reconstruction of Three-Dimensional Object Scenes, 1990.

Lee et al. "Robust Shape Reconstruction from Combined Shading and Stereo Information" SPIE vol. 1771 Applications of Digital Image Processing XV, pp. 171-182, 1992.

Powell et al. "Shedding Light on Cancer Diagnosis" Powell (Ed.), Laser Focus World pp. 1-11, May 2000.

Russel et al. "Simulation of Images by Photometric Stereo Modeling" Optical Engineering (ISSN 0091-3286), vol. 30, pp. 1337-1346. Research supported by DND, 1991.

Yang et al. "Two-Image Photometric Stereo Method" SPIE vol. 1826, pp. 452-463, Intelligent Robots and Computer Vision XI, 1992.

www.oceanoptics.com—pH Sensor & Accessories, © 2001.

Hirata et al. "Study of New Prognostic factors of Esophageal Variceal Rupture by Use of Image Processing with a Video Endoscope" Surgery, pp. 8-16, 1994.

(56) References Cited

OTHER PUBLICATIONS

Ichikawa et al. "Quantitative Analysis of Red Color Sign in the Endoscopic Evaluation of Esophageal Varices" Endoscopy vol. 33(9) pp. 747-753, 2001.
Frohlich, B. "Exploring Geo-Scientific Data in Virtual Environments" ACM Proc. Conf. on Vis., pp. 169-173, Figs 4-5, Nov. 1999.
Economides et al. "Advances in Production Engineering", Web, http://pumpjack.tamu.edu/-valko/CV/ValkoPDF/CanadianInvpaper.pdf., pp. 1-24, Sep. 11, 2003.
Nuntius et al. "Multimedia Technology, H.264—A New Technology for Video Compression" http://www.nuntius.com/technology3.html, pp. 1-4, Oct. 6, 2006.
Lewis B.S "The Utility of Capsule Endoscopy in Obscure Gastrointestinal Bleeding" Techniques in Gastrointestinal Endoscopy W.B. Saunders, vol. 5, No. 3, pp. 115-120, XP004795573 ISSN: 1096-2883, Jul. 2003.
Davidson et al. "Multi-viewing of Video Streams: A New Concept for Efficient Review of Capsule Endoscopy Studies" Gastrointestinal Endoscopy, vol. 57, No. 5, p. AB164, 2003.
Yoshitaka et al. "Content-Based Retrieval of Video Data by the Grammar of Film" IEEE Symposium on Visual Languages Proceedings, pp. 310-317, Sep. 1997.
Internet Archive Web Shots of Feb. 29, 2000 Weather.com, http://web.archive.org/web/*/http://www.weather.com/, pp. 1-15, Printed on Oct. 21, 2010.
Roubik et al. "Reference Microelectrodes Design Evaluation for On-Chip ISFET-Based Microsensors for "In Vivo" Blood Measurements".
www.obsltd.co.uk—Data Warehousing Printed on Jan. 22, 2001.
Bruil et al. "In Vivo Leucocyte Adhesion to Modified Polyurethane Surfaces", Biomaterials, vol. 13(13) pp. 915-923, 1992.
United States office Action of U.S. Appl. No. 10/097,096 dated Aug. 11, 2004.
United States Final office Action of U.S. Appl. No. 10/097,096 dated Feb. 24, 2005.
United States office Action of U.S. Appl. No. 10/097,096 dated Aug. 11, 2005.
United States Final Office Action of U.S. Appl. No. 10/097,096 dated Apr. 7, 2006.
United States Office Action of U.S. Appl. No. 10/097,096 dated Aug. 24, 2006.
United States Final Office Action of U.S. Appl. No. 10/097,096 dated Sep. 4, 2007.
United States Office Action of U.S. Appl. No. 10/097,096 dated Nov. 23, 2007.
United States Office Action of U.S. Appl. No. 10/097,096 dated Jun. 5, 2008.
United States Final Office Action of U.S. Appl. No. 10/097,096 dated Mar. 30, 2009.
United States Office Action of U.S. Appl. No. 10/950,480 dated Feb. 10, 2006.
United States Office Action of U.S. Appl. No. 11/723,253 dated Mar. 11, 2009.
United States Office Action of U.S. Appl. No. 12/615,794 dated Oct. 27, 2010.
United States Final Office Action of U.S. Appl. No. 12/615,794 dated Feb. 28, 2011.
United States Office Action of U.S. Appl. No. 12/615,794 dated Jul. 14, 2011.
United States Notice of Allowance of U.S. Appl. No. 13/398,386 dated Apr. 20, 2012.
United States Office Action of U.S. Appl. No. 10/949,220 dated Mar. 17, 2008.
United States Final Office Action of U.S. Appl. No. 10/949,220 dated Aug. 27, 2008.
United States Office Action of U.S. Appl. No. 10/949,220 dated Feb. 20, 2009.
United States Final Office Action of U.S. Appl. No. 10/949,220 dated Jul. 29, 2009.
United States Office Action of U.S. Appl. No. 10/949,220 dated Dec. 24, 2009.
United States Final Office Action of U.S. Appl. No. 10/949,220 dated Jul. 2, 2010.
United States Office Action of U.S. Appl. No. 10/949,220 dated Sep. 10, 2010.
United States Notice of Allowance of U.S. Appl. No. 10/949,220 dated Mar. 17, 2011.

\* cited by examiner

METHOD AND SYSTEM FOR IDENTIFICATION OF RED COLORED PATHOLOGIES IN VIVO

PRIOR APPLICATION DATA

The present application claims benefit from prior U.S. provisional application Ser. No. 61/472,453, filed Apr. 6, 2011, entitled "METHOD AND SYSTEM FOR IDENTIFICATION OF RED COLORED PATHOLOGIES IN VIVO", incorporation by reference in its entirety.

BACKGROUND OF THE INVENTION

Many pathological phenomena that are typical to body cavities are characterized by red color. Such phenomena include, for example, bleeding, edema, erosion, erythema, inflammation, neoplasia, polyps, etc.

There are some known methods for identification of red colored pathologies. Most of the known methods are based on identification of spectral characteristics and/or color contents of an image of the inspected tissue. In some of the known methods, for example, a reference color value or spectrum that represents color characteristics of a healthy tissue is obtained. Then, the color characteristics of the inspected tissue are compared to the reference color value or spectrum in order to identify color abnormalities which may indicate a pathology. However, methods for identification of red colored pathologies which are based only on the simple presence or absence of color may have high rate of false alarms, because many apparent color abnormalities on the image may have non-pathological reasons.

SUMMARY OF THE INVENTION

Embodiments of the present invention enable identification of in vivo pathologies that are characterized by red color with high rate of detection and low rate of false alarms, based on multiple analyses performed on red candidate regions in an image captured in vivo for identification of features indicative of the probability of pathology.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatuses may be specially constructed for the desired purposes, or may comprise general purpose computers selectively activated or reconfigured by a computer program stored in the computers. Such computer programs may be stored in a non-transitory computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE- PROMs), magnetic or optical cards, or any other type of media suitable for storing electronic instructions, and capable of being coupled to a computer system bus.

Embodiments of the invention may include an article such as a non-transitory computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The processes and displays presented herein are not inherently related to any particular computer or other apparatus. Various general purpose systems may be used with programs in accordance with the teachings herein, or it may prove convenient to construct a more specialized apparatus to perform the desired method. It will be appreciated that a variety of programming languages may be used to implement the teachings of the invention as described herein.

Figure 1:
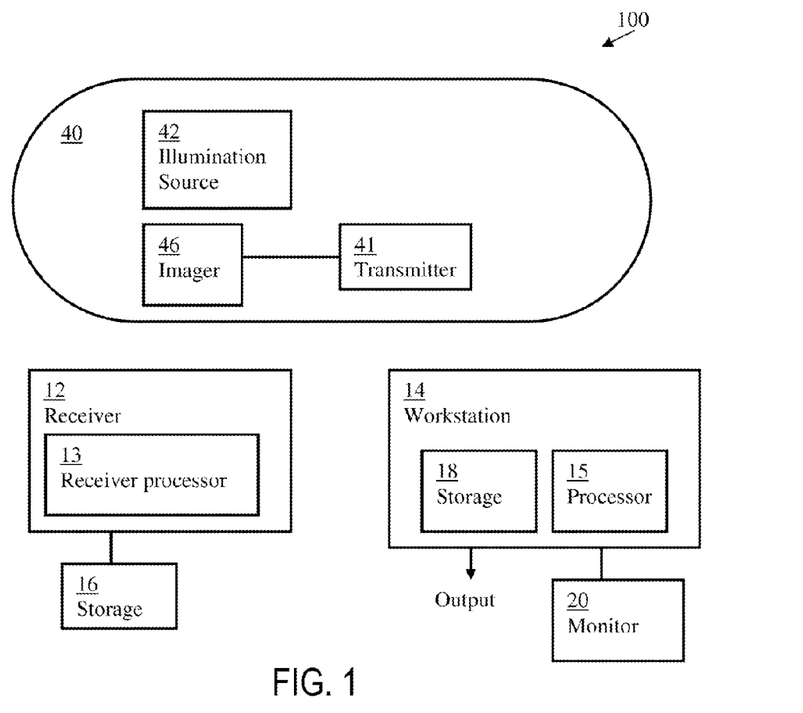
FIG. 1 is a schematic illustration of an in vivo imaging system according to some embodiments of the present invention.

Reference is now made to FIG. 1, which is a schematic illustration of an in vivo imaging system 100 according to some embodiments of the present invention. System 100 may include an in vivo imaging device 40, an external receiver 12, which may include a processor 13, and a workstation 14, which may include a processor 15. Either of processor 13 or processor 15 may execute code or instructions, for example stored in storage or memory 16 or storage or memory 18, to carry out embodiments of the present invention. Device 40 may include an illumination source 42, an imager 46 and a transmitter 41. Device 40 may be a swallowable device and/or may have shape and/or dimensions suitable for insertion into a body lumen and motility within a body lumen such as, for example, the gastrointestinal (GI) tract. In some embodiments of the present invention device 40 may be an autonomous device, e.g. may move in the body lumen (e.g., via peristalsis) independently from wired or tube connections to outside the body. Device 40 may be powered by an internal power source such as a battery and/or receive power from outside the body by a wireless power receiving system. System 100 according to embodiments of the present invention may be similar to embodiments described in U.S. Pat. No. 7,009,634 and/or in U.S. Pat. No. 5,604,531, each of which are assigned to the common assignee of the present application and each of which are hereby incorporated by reference. Of course, devices and systems as described herein may have other configurations and other sets of components. In alternative embodiments of the present invention, device 40 may not be an autonomous device. For example, device 40 may be included in any other vehicle suitable for traversing a lumen in a human body, such as an endoscope, stent, catheter, needle etc.

Device 40 may advance autonomously in an in vivo body lumen such as, for example, the GI tract, and may capture images as it travels along the in vivo body lumen. In some embodiments, device 40 may additionally collect other in vivo data such as, for example, PH data, temperature data or any other suitable kind of in vivo data.

Illumination source 42 may illuminate the in-vivo body lumen to enable capturing of in vivo images by imager 46. The light reflected from the body lumen may be converged or focused onto imager 46 by a suitable optical system (not shown) that may include, for example, a suitable structure of one or more lenses, mirrors and/or other optical components. Other components may be included in device 40 such as, for example, different suitable kinds of sensors, optics, electronics and/or structures, for example according to a specific purpose or mission assigned to device 40. Preferably, imager 46 is a suitable CMOS camera, such as a "camera on a chip" type CMOS imager specified by Given Imaging Ltd. of Israel and designed by Aptina Corporation of California, USA. In alternate embodiments, imager 46 may be another device, for example, a CCD. Illumination source 42 may be, for example, one or more light emitting diodes, or another suitable light source.

Device 40 may transmit by transmitter 41 captured images and/or other collected in vivo data and/or other information to receiver 12. Optionally, system 100 may include a memory or storage device or medium 16, in which the data received by receiver 12 may be stored. The received data may further transmitted to workstation 14. The transmission of data from receiver 12 to workstation 14 may be controlled by, for example, processor 13 in receiver 12. Workstation 14 may receive data from receiver 12 and/or from storage medium 16 and process the data and store the processed data in a memory or storage device or medium 18 and/or output the processed data to any suitable output device, such as, for example, a workstation, display, printer, mobile device and/or any other suitable output device. Memories or storage mediums 16 and/or 18 may include any of the computer readable storage medium mentioned above.

According to some embodiments of the present invention, the image data captured by imager 46 and received by workstation 14 may be a digital color image data, although other image formats may be used in alternate embodiments. In an exemplary embodiment, each frame of image data includes 256 rows of 256 pixels each, each pixel including bytes for color and intensity, according to known methods. For example, in each pixel, color may be represented by a mosaic of four sub-pixels, each sub-pixel corresponding to a color component such as red (R), green (G), or blue (B) (also called primary colors), wherein one color component is represented twice, e.g., in two sub-pixels in a pixel. The intensity of the overall pixel may be recorded by a one byte (i.e., 0-255) brightness value. The images may be received sequentially by receiver 12 and stored (e.g., sequentially) in storage medium 16 and/or storage medium 18 at workstation 14. The stored data may include color parameters such as color and intensity for each captured image pixel.

The operations of workstation 14 and its processor 15, which will be described in detail herein below, may take place, for example, by instructions being executed by processor 15. The instructions may be stored in non-transitory storage medium 18 or in any other non-transitory storage medium readable by processor 15.

According to embodiments of the present invention, workstation 14 processes the received images for identification of in vivo pathologies that are characterized by red color, for example as described in more detail herein below with reference to FIGS. 2-11. Such pathologies may include, for example, bleeding, edema, erosion, erythema, inflammation, neoplasia, polyps, etc. The processing by workstation 14, according to embodiments of the present invention, results in an indication, for each processed image, about presence of a pathological region, which may indicate whether a pathological region is present with high probability in the in vivo area captured in the image (e.g., the image is likely to depict a pathological region). While in some embodiments workstation 14 performs methods according to an embodiment of the present invention, in other embodiments, other units, such as processor 13 in receiver 12 may perform some or all of an embodiment of the present invention.

Workstation 14 may output the results for observation by a health professional, for example by outputting the captured images and the resulted indications in relation to the captured images. In some embodiments of the present invention, the outputted images may be displayed on monitor 20 together with information about of the location in the body lumen where the image was captured, so that, for example, the health professional may identify the location of pathology in a body lumen. In some embodiments of the present invention, the output images may be displayed sequentially according to chronological order. In some embodiments of the present invention, the indication about presence of pathological regions may be used as a criterion for deciding whether the image should be output for viewing by the health professional. For example, the indication about presence of a pathological region may be used as a criterion for editing an image stream, for example in a method for editing an image stream as described in U.S. Patent Application Publication Number 2006/0074275, which is assigned to the common assignee of the present application and is hereby incorporated by reference. The output captured images and/or indications about presence of pathological regions may be displayed together with other related data, such as, for example, the chronological time related to the captured image, a color bar summary, the location of the imaged area in the in vivo body lumen, other data sensed in this location and/or any other related presentation of data and/or indications. For example, the output device may be a display similar to the display described in U.S. Patent Application Publication Number 2005/0075551, now U.S. Pat. No. 7,215,338, which is assigned to the common assignee of the present application and is hereby incorporated by reference.

Figure 2:
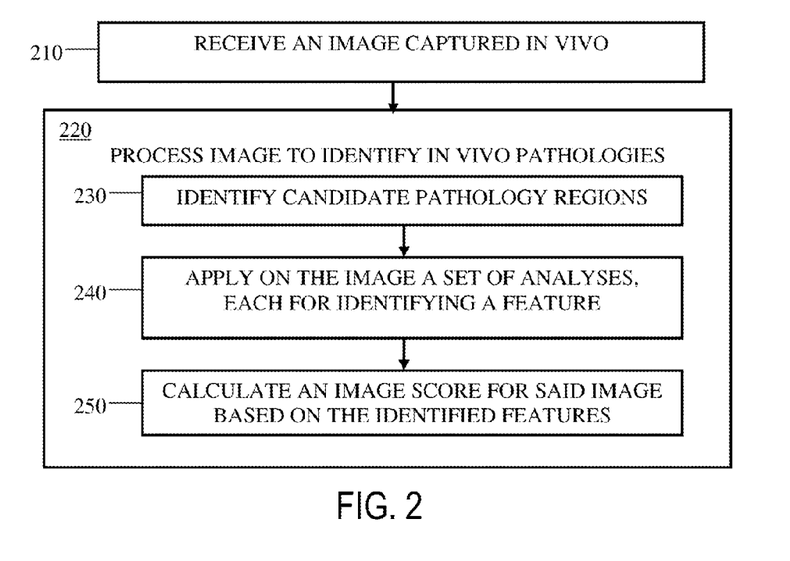
FIG. 2 is a flowchart illustrating a method for identification of in vivo pathologies according to embodiments of the present invention.

Reference is now made to FIG. 2, which is a flowchart illustrating a method for identification of in vivo pathologies according to embodiments of the present invention. In one embodiment, the operations shown are, implemented by workstation 14 and/or receiver 12. However, in other embodiments, other systems may carry out these operations. As indicated in block 210, the method may include receiving an image captured in vivo, for example captured by imager 46 in device 40 as described above. The received image may be received at workstation 14 from, for example, receiver 12 and/or storage medium 16. The image received at workstation 14 may be stored in storage medium 18 in workstation 14. As indicated in block 220, the method may include processing the image for identification of in vivo pathologies. As described above, according to embodiments of the present invention, the processing may particularly identify in vivo pathologies that are characterized by red color.

As indicated in block 230, the processing may include identifying candidate pathology regions or areas in the image (e.g., that a pathology is shown or imaged in the image). According to embodiments of the present invention, the identification of candidate pathology regions or areas may be based on identification of red regions or areas in the image, for example as described in more detail herein with reference to FIGS. 3 and 4. For example, a red criterion value may be calculated for area elements or image elements of the image, such as, for example, image pixels, groups of pixels or any subgroup of the image, based on location of color of the image area element in RGB space. For example, based on the locations of the colors in RGB space, the area elements of the image may be classified as red or non-red area elements by a suitable classification tool such as, for example, a non-linear Support Vector Machine (SVM) as described in more detail herein. In such a manner, or using other manners, red regions, regions having high instances, or relatively high proportions of, red or red-like colors, may be identified. After red regions or areas in the image are identified as candidate regions or areas, candidate pathology regions may be extracted from or identified among the red regions or areas. For example, candidate pathology regions that are redder than their surroundings, e.g., their red criterion value is higher than the red criterion value of their surroundings, may be identified by selection of identified red regions according to multiple thresholds of red criterion values applied on the image.

The surroundings (or perimeter) of a candidate area may include, for example, an area of a certain pixel width or radius (e.g. a predetermined number of pixels) which is in the vicinity of the candidate area, or which borders the candidate area. For example, in case of a round candidate area, the surroundings may include a ring of a predetermined or calculated number of pixels, e.g. 20 pixels, which are positioned around the candidate area. In some embodiments, the surrounding area may be calculated in relation to the size of the candidate area. In one example, if the candidate area is an area which may be approximately 10 pixels in diameter, the surrounding area may include for example, a ring of pixels measured from the border of the candidate area. The ring width (or diameter) may be determined as a percentage of pixels, e.g. based on the size of the candidate area. In one example, the perimeter of the candidate area may be calculated as an addition of, for example, 50% of the diameter of the candidate area. Different forms and shapes of candidate areas may be detected, not necessarily symmetrical or geometric shapes. The surrounding (e.g. perimeter) area may be determined in relation to the candidate area.

Figure 9:
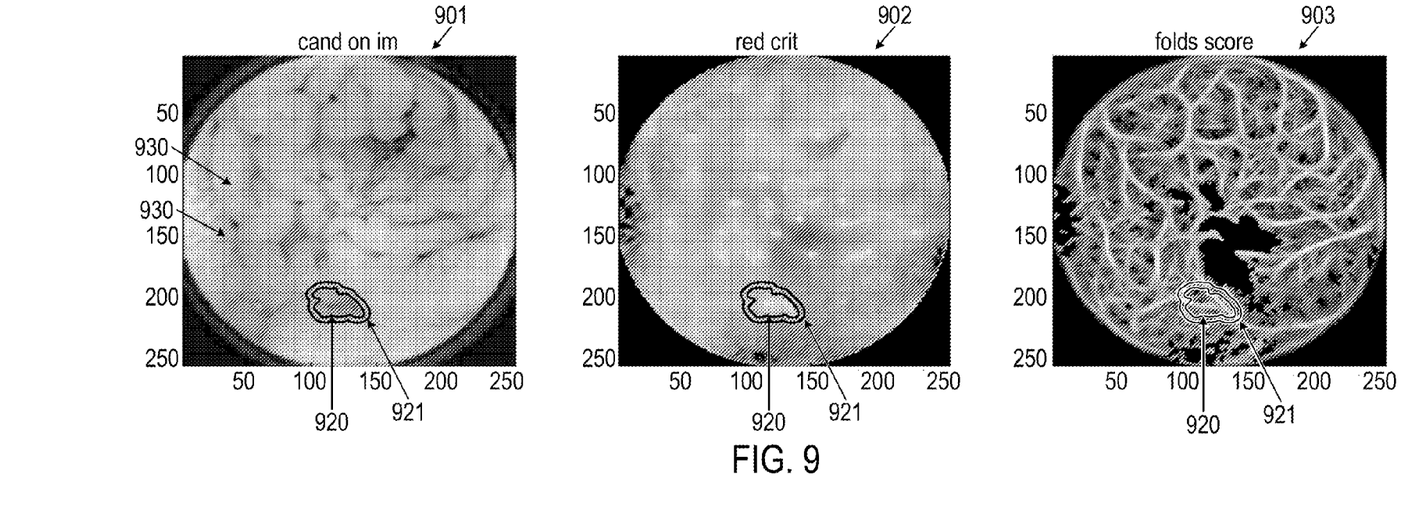
FIG. 9 shows an image captured in vivo, a red criterion presentation and a folds score presentation of the image processed according to embodiments of the present invention.

Referring now to FIG. 9, the perimeter of a candidate area may be defined as the dilation or expansion of the candidate area, minus the candidate area. An example of a perimeter of a candidate region is shown in image 901 of FIG. 9, where the candidate region 920 is the inner portion, and the outer line indicates the perimeter 921 (e.g. surroundings or expansion) of the candidate region 920 (it is noted that the perimeter 921 lies between the two lines, and does not include the candidate region 920). In some embodiments, the perimeter of a candidate area may be expanded only within a predefined region of interest in the image. For example, the predefined region of interest may include only a portion of the pixels of the captured image. The perimeter may be calculated, for example, by expanding the candidate area with a bounding shape with a distance of 5 pixels from the border of the candidate area, e.g. for an image of 256×256 pixels. Other numbers may be used.

Referring back to FIG. 2, as indicated in block 240, the processing may include applying on the image, or processing the image using, one or more of, or a set (where a set may include one analysis) of analyses, processes, or functions, such as for example filters, image analysis processes, or feature identification processes, each for identifying (e.g., in each candidate region) a feature indicative of the probability of pathology of the candidate regions, e.g., the probability that a pathology is imaged, depicted or shown in candidate regions of an image. Each analysis may be carried out or applied by, for example, a processor (e.g., a processor shown in FIG. 1). For example, an analysis when applied may calculate and/or assign a value, score or rating to an area or candidate region, wherein the value corresponds to the measure/level/intensity of the feature in the area or candidate region. The feature may be indicative of the probability of pathology of red regions. For example, some of the identified features may be typical for red pathology regions, and therefore identification of such feature in high measure in positional relation to a candidate region in the image may be indicative of high probability of pathology of the candidate region. Such features that are typical for red pathology regions may include, for example, relative uniformity of color within the pathology region, high mean red criterion within the pathology region relative to its surrounding area (e.g. perimeter) and/or relative to the rest of the image, a regular shape with high correlation to an ellipse shape and/or other possible features.

The application of analyses, processes, or functions may be by, e.g., a processor executing instructions or software modules, and each analysis, process, or function may produce an output, rating or score. The outputs, ratings or scores of the analyses may be combined to produce a determination or score for the overall image.

Additionally, some of the identified features may be typical for red regions which are not pathologies, and therefore identification of such feature in high measure in positional relation to a candidate region in the image may be indicative of low probability of pathology of the candidate region. For example, some of the identified features may be physical features such as, for example, folds in the in vivo tissue and/or bubbles or froth on the tissue surface, which may cause false identification of apparent red regions or of pathologies in the image, and therefore identification of such physical feature in high measure in positional relation to a candidate region in the image may be indicative of low probability of pathology of the candidate region.

As indicated in block 250, the processing may include calculating a score or rating for the image based on the identified feature ratings or scores, the image score or rating indicative of existence in the image of at least one candidate region or area with high probability of pathology. The calculation of an image score may include calculation of a score for each identified candidate region or area based on the identified features and/or respective values, the candidate score indicative of the probability of pathology of the candidate region. The image score may correspond to the candidate score of the candidate region with the highest probability of pathology in the image. For example, the image score may be equal to the candidate score of the candidate region with the highest probability of pathology in the image. Other methods of generating an image score or rating based on candidate region scores or ratings may be used.

Figure 3:
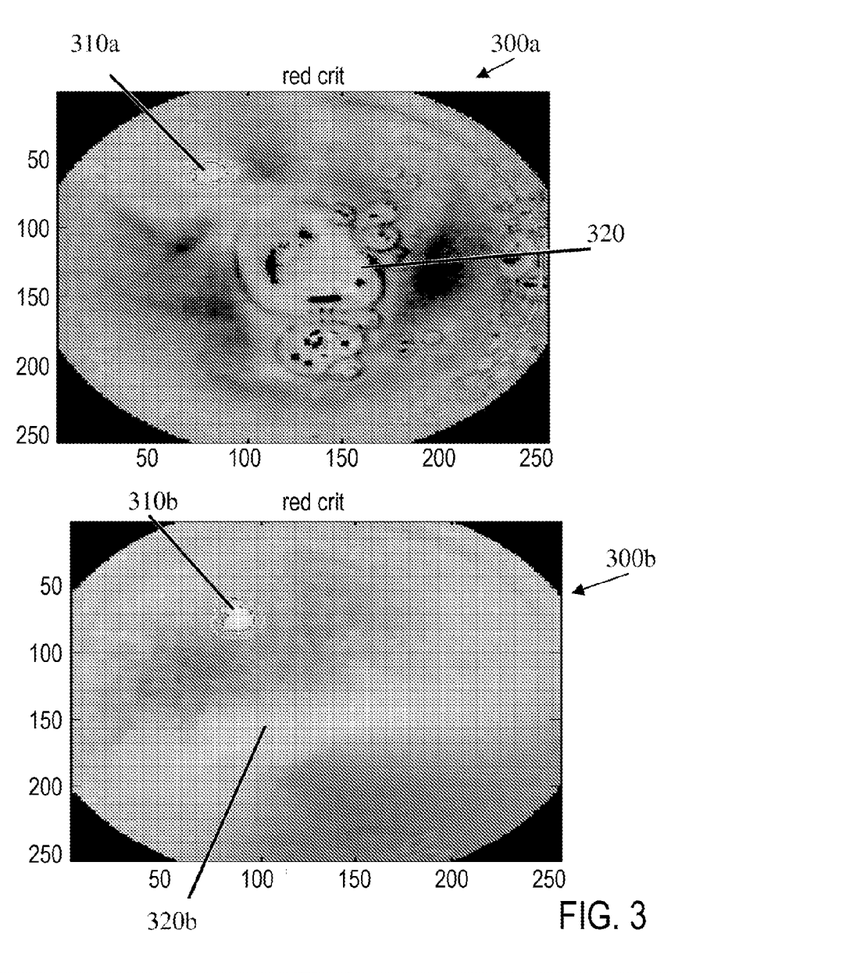
FIG. 3 is a red criterion presentation of two exemplary images captured in vivo and processed according to embodiments of the present invention.

Reference is now made to FIG. 3, which is a red criterion presentation of two exemplary images 300a and 300b captured in vivo and processed according to embodiments of the present invention. In the red criterion presentation of FIG. 3, darker or lighter regions of the image represent low or high red criterion values, respectively, the red criterion values calculated according to embodiments of the present invention as described herein. Accordingly, in the example shown lighter regions of the image represent high red criterion values, e.g. redder regions. As described, candidate pathology regions may be identified based on identification of red regions and further based on other criterions and/or identified features. Regions 310a, 310b, 320a and 320b in images 300a and 300b may be identified as red regions or areas, and thus as candidate pathology regions or areas. Regions 310a and 310b, shown in FIG. 3 encircled by double delineation, may be also identified as candidate pathology regions, for example based on further criterions and/or identified features. However, while regions 320a and 320b are identified as red regions, they may be removed from consideration as candidate pathology regions, and thus not identified as candidate pathology reasons, for example based on further criterions and/or identified features.

Figure 4:
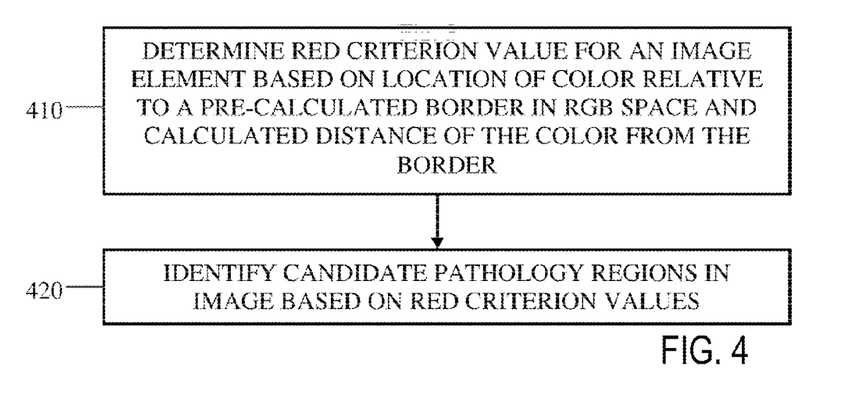
FIG. 4 is a flowchart illustrating a method for identifying candidate pathology regions according to embodiments of the present invention.

Reference is now made to FIG. 4, which is a flowchart illustrating a method for identifying candidate pathology regions according to embodiments of the present invention.

As indicated in block 410, the method may include determining a red criterion value for an image area element based on for example the location of a color of the image area element, for example in RGB presentation, relative to a pre-calculated border in RGB space of colors, the pre-calculated border distinguishes between a red portion and a non-red portion of the RGB color space. The RGB color space has three dimensions that represent the red (R) green (G) and blue (B) components of color, wherein the exact chromaticities of the red, green and blue components depend on color definitions and/or parameters of imaging system 100 being used. Substantially every color in an image produced by imaging system 100 can be mapped to the RGB space, wherein the location of the color in the RGB space is determined according to the intensities of the red, green and blue components of this color. The pre-calculated border that distinguishes between red and non-red portions of the RGB space may be pre-calculated, for example, by training of a classification tool such as, for example, a non-linear Support Vector Machine (SVM). Given a set of training examples, e.g., images which include identified red and/or non-red area elements, the SVM training algorithm may build a model that identify new samples, e.g., area elements of newly received images, as belong to the red portion or to the non-red portion of the RGB space. The distance, in the RBG color space, of the color from the border may correspond to the red criterion value, which may therefore be calculated based on the distance, wherein a color located in the red portion of the color space may have a positive red criterion value and a color in the a non-red portion of the color space may have a negative red criterion value. The red criterion value may correspond to the redness such that, for example, a high positive red criterion value indicates a high redness level. Thus, for example, red regions in the image may be identified, and the measure of redness of a red region may be determined.

As indicated in block 420, the method may include identifying candidate pathology regions or areas in the image based on the determined red criterion values. For example, multiple thresholds or analyses of red criterion may be applied on the image for comparison between the various red regions in the image, in order to identify red regions which are redder than the rest of the image and/or than their surroundings on the image, e.g., their red criterion value is higher than the red criterion value of the rest of the image and/or than the red criterion of their surroundings in the image. The redder red regions may be identified as candidate pathology regions.

Additionally, in some embodiments of the present invention, potential candidate pathology regions may be filtered out, not identified as candidate regions, removed from consideration as candidate regions, or from the set of candidate regions, based on certain analyses. For example, very small red regions such as, for example, red regions which are not visible to a human eye, with or without certain vision equipment, may be excluded and/or not identified as a candidate region.

Additionally or alternatively, in some embodiments of the present invention, a morphological opening operation may be applied on the shapes boundaries of the red regions, which may, for example, remove from consideration, or from the set of candidate regions, very small and/or very narrow red regions, smooth boundaries of the shape of the red region and/or edit or alter candidate regions by, for example, removing small and/or narrow outward bumps from the shape boundaries and/or narrow openings in the shape boundaries. This operation may filter out very small and/or very narrow red regions. Additionally, this operation may facilitate shape analyses of the candidate region such as, for example, comparisons of the candidate region's shape to typical pathological shapes, for example an ellipse shape, as described in more detail herein.

In an image captured in vivo and processed according to embodiments of the present invention, a set of many candidate pathology regions may be identified. For example, an average of about 100 candidate regions may be identified in one image. As described, a set of analyses may be applied on the image for identifying features indicative of the probability of pathology of the candidate regions. Based on the measure/level/intensity of the feature in relation to a candidate region, a candidate score can be calculated for estimating the probability of pathology of the candidate region.

Figure 5:
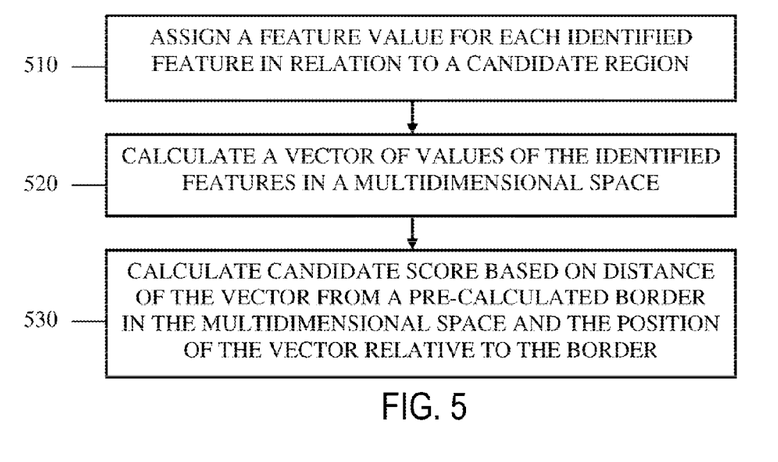
FIG. 5 is a flowchart illustrating a method for calculating a candidate score for each identified candidate region according to embodiments of the present invention.

Reference is now made to FIG. 5, which is a flowchart illustrating a method for calculating a candidate score or rating for each identified candidate region or area according to embodiments of the present invention, the candidate score indicative of the probability of pathology of the candidate region. As indicated in block 510, the method may include assigning a value or rating for each identified feature in relation to candidate regions, each value correspond to the measure, level or intensity of the feature(s) in a certain candidate region. The features may include the features mentioned above and/or any other features indicative of the probability of pathology of candidate regions. The respective feature values may be calculated and/or assigned, for example, according to the methods described in detail with reference to FIGS. 6-11.

As indicated in block 520, the method may include calculating for each candidate region a representative vector of values of the identified features in a multidimensional features space, wherein each dimension represents an identified feature. The multidimensional features space has number of dimensions, each of which corresponds to one of a number of identified features. Each candidate region has a set of values, wherein each value represents the measure, level or intensity of a feature in that region. Therefore, each candidate region may be represented by a vector of feature values in the multidimensional space of features, wherein the position of the representative vector in the multidimensional space of features is corresponds to the values of features in the represented candidate region.

As indicated in block 530, the method may include calculating a candidate score based on position of the vector relative to a pre-calculated border in the features space, the border distinguishing between a pathological portion and a non-pathological portion of the features space. The pre-calculated border may be pre-calculated by training of a classification tool such as, for example, a non-linear Support Vector Machine (SVM) such as, for example, a Radial Basis Function (RBF) SVM or any other classification tool suitable for classification relative to a non-linear border in a multidimensional space. Given a set of training examples, e.g., images regions identified as pathological or non-pathological regions, which include identified features with determined values, the SVM training algorithm may build a model that identify new samples, e.g., regions of newly received images, as belong to the pathological portion or to the non-pathological portion of the features space.

The candidate score may correspond to and/or be calculated based on the distance of the vector from the border, wherein a vector located in the pathological portion of the features space may have a positive and/or high candidate score and a vector in the a non-pathological portion of the features space may have a negative and/or low candidate score. The candidate score may correspond to the probability of pathology such that, for example, a high positive candidate score indicates a high probability of pathology. Accordingly, based on the position of the calculated vector in the multidimensional space of features relative to the pre-calculated border, the candidate regions may be classified as pathological regions or non-pathological regions by a suitable classification tool such as, for example, a non-linear Support Vector Machine (SVM) such as, for example, a Radial Basis Function (RBF) SVM or any other classification tool suitable for classification relative to a non-linear border in a multidimensional space.

According to embodiments of the present invention, analyses are applied on the image for identifying features indicative of the probability of pathology of the candidate regions. Some of the analyses for features identification may identify features relating to absolute and relative mean red criteria, for example based on the red criterion values calculated as described in detail. The features of absolute and relative mean red criteria may be indicative of the probability of pathology of red regions because, for example, many pathological red regions are redder than their surroundings, which may also be red to some degree.

Figure 6:
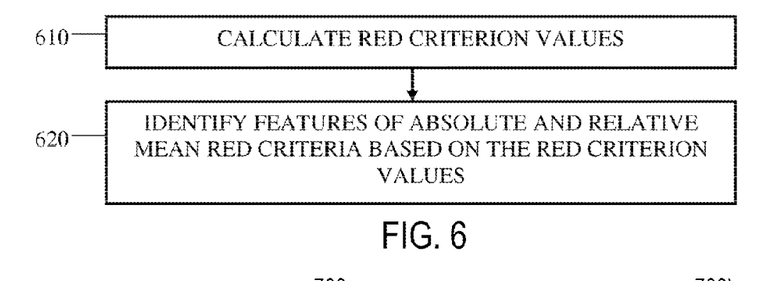
FIG. 6 is a flowchart illustrating a method for identifying features of absolute and relative mean red criteria according to embodiments of the present invention.

Reference is now made to FIG. 6, which is a flowchart illustrating a method for identifying features that relate to absolute and relative mean red criteria according to embodiments of the present invention. As indicated in block 610, the method may include calculating red criterion values, for example as described in detail above. As indicated in block 620, the method may include identifying features of absolute mean red criteria, e.g. the mean red criteria within a region, and relative mean red criteria, e.g. the mean red criteria within a region relative to or compared to the mean red criteria outside the region, based on the red criterion values. Some of these features may include, for example, an interior mean red criterion value within a candidate region, the ratio between the interior mean red criterion value to the surrounding mean red criterion value in immediate surroundings of the candidate region, and the ratio between the interior mean red criterion value to the external mean red criterion value in the image outside the candidate region. Accordingly, the analyses may include calculations of an interior mean red criterion value within candidate regions, a surrounding mean red criterion value in immediate surroundings of the candidate regions and an external mean red criterion value in the image outside the examined candidate region. Then, the interior mean red criterion value may be compared to the surrounding mean red criterion value and to the external mean red criterion value, for example, by calculations of ratios between these values. The interior mean red criterion value and/or the calculated ratios may be used as feature values for calculation of a representative vector for the candidate region in the multidimensional features space, as described above.

An additional analysis may be applied on the image for calculations of standard deviation of red criterion value within candidate regions, which may be indicative of the uniformity of color within the candidate region. The standard deviation feature of red criterion value within a candidate region may be indicative of the probability of pathology of red regions because, for example, many pathological red regions have relatively uniform color. Accordingly, as the standard deviation is smaller, the probability that the candidate region shows or images a pathology may be higher. Therefore, as the standard deviation of the red criterion value in the candidate region is smaller, the value of the standard deviation feature assigned to this candidate region, for calculation of the representative vector in the feature space, may be higher.

Other analyses may be applied to the image for identifying features indicative of the probability of pathology shown or imaged in the candidate regions. Some of the features may not be directly related to the red criterion values, but still may be indicative of the probability of pathology of red regions. For example, many pathological red regions have an ellipse or elliptical shape with low degree of oblongness, e.g., an aspect ratio relatively close to 1. Accordingly, analyses may be applied on shapes of candidate regions for determining the similarity of the shape to an ellipse and the degree of oblongness of the shape. Accordingly, a correlation between the shape of a candidate region and an ellipse shape and the oblongness, e.g. aspect ratio, of the shape of the candidate region may be measured. For example, by computational tools, the closest ellipse shape to the shape of the candidate region may be identified. Generally, an ellipse shape can be mathematically represented by a mathematical center of mass vector and a typical 2×2 covariance matrix. Accordingly, in some embodiments of the present invention, the closest ellipse shape to the shape of the candidate region may be identified, for example, by estimating the center of mass and the covariance matrix according to the spatial and central mathematical moments of the shape of the candidate region, respectively. The smaller and larger eigenvalues of the inverse covariance matrix correspond to the minor and major axes of the ellipse, and therefore the aspect ratio can be calculated.

After the closest ellipse shape and the aspect ratio are identified, the correlation between the shape of a candidate region and the closest ellipse shape may be calculated. As the correlation between the shape of a candidate region and the closest ellipse shape is higher, the probability that the candidate region shows a pathology may be higher. Additionally, the closer the aspect ratio of the closest ellipse shape to 1, the higher the probability that the candidate region shows a pathology. Therefore, as the correlation between the shape of a candidate region and the closest ellipse shape is higher, the value of the ellipse correlation feature assigned to this candidate region, for calculation of the representative vector in the feature space, may be higher. Additionally, as the aspect ratio of the closest ellipse shape is closer to 1, the value of the aspect ratio feature assigned to this candidate region, for calculation of the representative vector in the feature space, may be higher.

Additionally, as mentioned above, other analyses, filters, image analysis processes, or feature identification processes, may be applied on the image for identifying physical features such as, for example, folds in the in vivo tissue and/or bubbles/froth on the tissue surface and/or other physical features, which may cause false identification of apparent red regions in the image. Identification of such physical feature in positional relation to a candidate region in the image may be indicative of low probability of pathology of the candidate region.

Bubbles and/or froth on the tissue surface in an in vivo body lumen may cause the area beneath the bubble/froth to appear red and/or redder than the actual color of this area, and therefore this area may be falsely identified as a candidate pathology region. However, at least a portion of the perimeter of a bubble may appear white because of light distortions caused by the bubble. Therefore, in some embodiments of the present invention, in order to identify bubbles and/or froth on the tissue surface, analyses may be applied for identifying whiteness features in the perimeters of candidate regions. For example, whiteness criterion values may be assigned to area elements of the image, as described in more detail herein.

Figure 7:
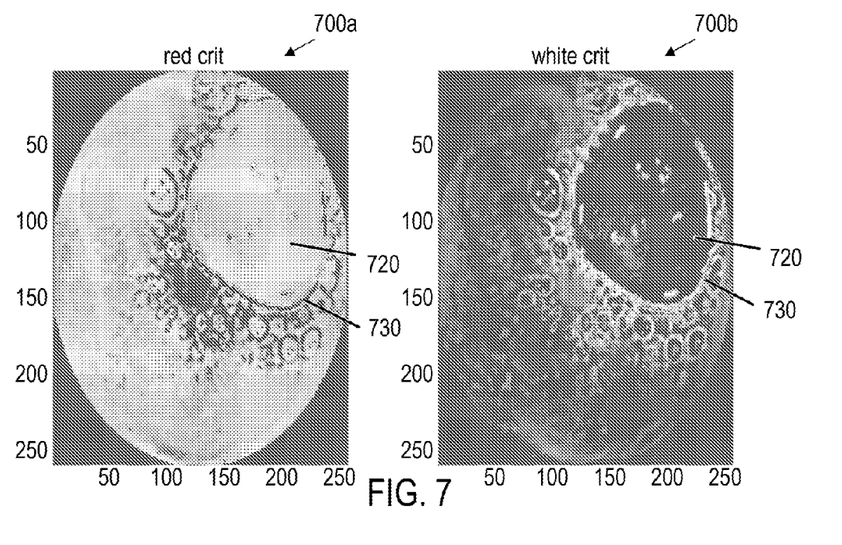
FIG. 7 shows a red criterion presentation and a whiteness criterion presentation of an image captured in vivo and processed according to embodiments of the present invention.

Reference is now made to FIG. 7, which shows a red criterion presentation 700a and a whiteness criterion presentation 700b of an image captured in vivo and processed according to embodiments of the present invention. In each criterion presentation, lighter areas represent higher values of the presented criterion in these areas. The red criterion values shown in red criterion presentation 700a may be calculated as described in detail above. Based on the red criterion values, an area 720 may be identified as a candidate pathology region, for example, based on absolute high red criterion values within area 720 and/or relatively high red criterion values within area 720 compared to red criterion values in the close surroundings. The whiteness criterion values shown in white criterion presentation 700b may be calculated as described in detail in the following paragraphs. As shown in whiteness criterion presentation 700b, most of perimeter 730 of candidate region 720 includes high values of whiteness criterion, which indicates on high probability that candidate region 720 is located behind a bubble and thus, for example, the probability that candidate region 720 is a red pathology region decreases.

According to embodiments of the present invention, whiteness of an image area element is characterized by high light intensity value and small differences between the color components R, G and B brightness values in this image area element. The light intensity values may be calculated based on a weighted sum of the R, G and B brightness values. For example, in some embodiments of the present invention, the light intensity values may be represented by the average of the R, G and B brightness values, wherein the R, G and B values has the same weight. Other methods may be used for representing the intensity value. For example, the intensity value may be represented by the highest brightness value among the R, G and B brightness values, or by the average between the highest brightness value and the lowest brightness value among the R, G and B brightness values. Accordingly, the whiteness criterion values shown in whiteness criterion presentation 700b may be calculated based on light intensity values and differences between the R, G and B brightness values, wherein a combination of high light intensity value and small differences between the R, G and B brightness values in an image area element correspond to high whiteness criterion value of the image area element. However, in case the light intensity value in the image area element is low and/or the difference between at least one couple among the R, G and B brightness values in the image area element is high, a low whiteness criterion value will be assigned to the image area element. Accordingly, in one exemplary embodiment, the formula for determining the whiteness criterion value may have the following form (other suitable formulas may be used):

$$[(R+G+B)/3]-\text{Max}\{|R-G|,|R-B|,|B-G|\}$$

wherein R, G and B are the R, G and B brightness values. In order to determine the whiteness criterion value, the results of the above formula may be normalized to range from 0 to 1. However, the formula may have other forms which conform to the principles described.

As mentioned, analyses may be applied for identifying whiteness features in the perimeters of candidate regions, such as, for example, in perimeter 730 of candidate region 720 shown in FIG. 7. As mentioned above, these analyses may identify bubbles and/or froth on the tissue surface, which may cause areas beneath the bubbles/froth to appear red and/or redder than the actual color of these areas.

Figure 8:
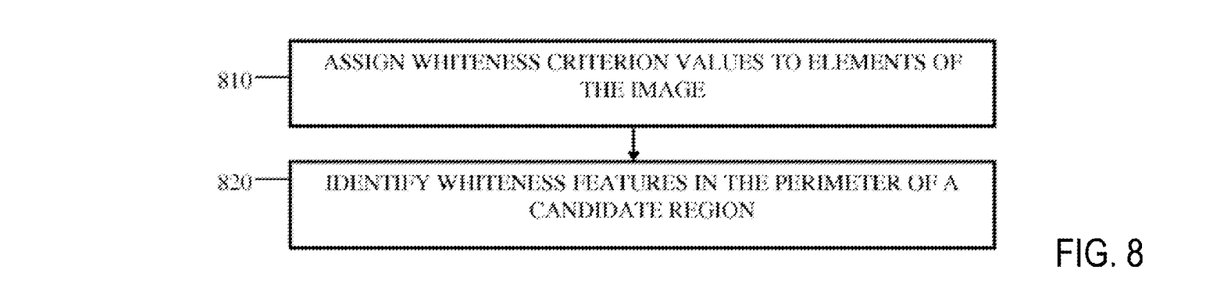
FIG. 8 is a flowchart illustrating a method for identifying bubbles and/or froth on the imaged tissue surface according to embodiments of the present invention.

Reference is now made to FIG. 8, which is a flowchart illustrating a method for identifying bubbles and/or froth on the imaged tissue surface according to embodiments of the present invention. As indicated in block 810, the method may include assigning whiteness criterion values to area elements of the image, for example as described in detail above. As indicated in block 820, the method may include identifying whiteness features in the perimeter or surroundings of a candidate region. For example, the whiteness features may include the median whiteness criterion value in the perimeter of a candidate region and the 95$^{th}$ percentile whiteness criterion value in the perimeter of a candidate region which may be calculated by corresponding analyses. Other analyses may be applied in order to identify whiteness features in the perimeters of candidate regions.

As mentioned above, folds in the in vivo tissue may cause image area elements to appear red and/or redder than the actual color of this area, and therefore this area may be falsely identified as a candidate pathology region. Therefore, in some embodiments of the present invention, analyses may be applied on the image in order to identify folds in the tissue. Based on the analyses, scores/values may be assigned to image area elements to represent the fitting of the image area elements to predetermined criteria that characterize folds, such that, for example, high fold score assigned to an image area element correspond to high probability that the image area element shows a fold or a fold segment.

Reference is now made to FIG. 9, which shows an image 901 captured in vivo with a candidate pathology, a red criterion presentation 902 of the same image and a folds score presentation 903 processed according to embodiments of the present invention. In each criterion/score presentation, lighter areas represent higher values of the presented criterion/score in these areas. The red criterion values shown in red criterion presentation 902 may be calculated as described in detail above. An area 920, shown in FIG. 9, may be identified as a candidate pathology region based on the red criterion values, for example, based on absolute high red criterion values within area 920 and/or relatively high red criterion values within area 920 compared to red criterion values in the close surroundings or in the perimeter of the candidate area, for example in the area which lies between area 920 and perimeter line 921. The folds 930 which can be seen in image 901 are presented by a folds score presentation 903. The folds score values shown in folds score presentation 903 may be calculated according to predetermined criteria that characterize folds as described in detail the following paragraphs. As shown in folds score presentation 903, the image may be covered with lines 930 of high folds score, including lines 930 within candidate region 920. Therefore, the probability that lines 930 show folds in the imaged tissue is high. Accordingly, candidate region 920 appear redder because of the folds, and thus, for example, the probability that candidate region 920 is a red pathology region decreases.

According to embodiments of the present invention, folds in the imaged tissue are characterized by smaller color brightness values and higher color saturation levels in greater depths of the fold, for example since smaller amount of white light enters the fold. Additionally, the folds areas have characteristic distribution of color saturation with higher color saturation levels in greater depths of the fold. The characteristic distribution of color saturation can be pre-identified and a fold template of color saturation distribution may be determined accordingly, such as the fold template shown in FIG. 11 described in detail herein. Therefore, a folds score can be assigned to an image area element based on the color brightness values, color saturation levels and correlation between the color saturation distribution and the predetermined fold template.

It will be appreciated that the terms "brightness value" and "saturation" used herein mean "value" and "saturation" as conventionally defined in relation to the HSV (Hue, Saturation, Value) color model know in the art. The "value" is sometimes called "brightness", and then the color model is called HSB (Hue, saturation, Brightness).

Figure 10:
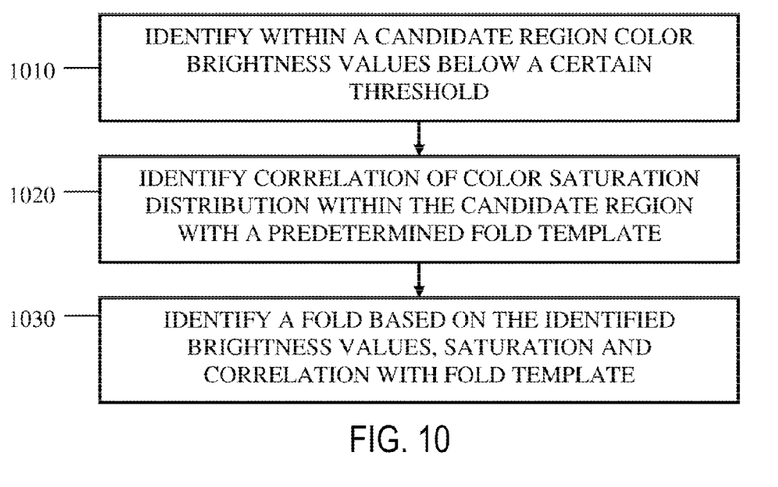
FIG. 10 is a flowchart illustrating a method for identifying folds in the imaged tissue according to embodiments of the present invention.

Reference is now made to FIG. 10, which is a flowchart illustrating a method for identifying folds in the imaged tissue according to embodiments of the present invention. As indicated in block 1010, the method may include identifying, within a candidate region, color brightness values below a certain threshold, for example a threshold that may be predetermined according to characteristic brightness values in folds areas. As indicated in block 1020, the method may include identifying correlation of color saturation distribution within the candidate region with a predetermined fold template, as described above. As indicated in block 1030, the method may include identifying a fold based on the identified brightness values, saturation levels and correlation of saturation distribution with the predetermined fold template. For example, a folds score or rating can be assigned to an image area element based on the identified color brightness values below the predetermined threshold, color saturation levels and correlation between the color saturation distribution and the predetermined fold template. For example, the fold score may be calculated by multiplying the identified color brightness values below the predetermined threshold by the corresponding saturation levels in the same image area elements and by the correlation between the color saturation distribution and the predetermined fold template in the same image area elements. The correlation between the color saturation distribution and the predetermined fold template may be calculated by a correlation function as known in the art.

Figure 11:
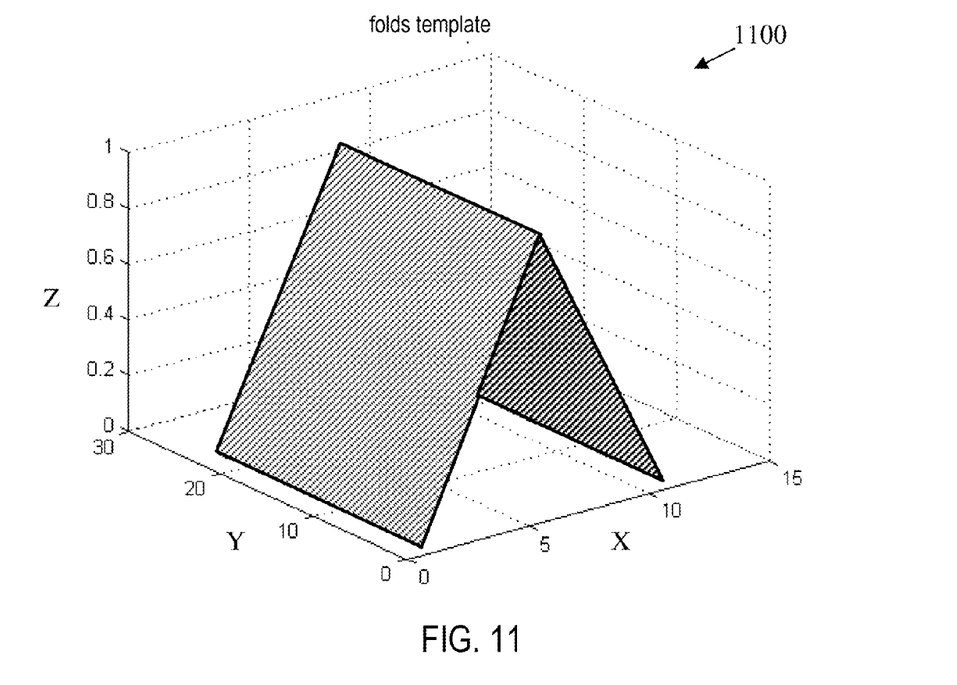
FIG. 11 is a schematic diagram of a predetermined fold template, to which a color saturation distribution in a fold area may correlate according to embodiments of the present invention.

Reference is now made to FIG. 11, which is a schematic diagram of a predetermined fold template 1100, to which a color saturation distribution in a fold area may correlate according to embodiments of the present invention. The X and Y axes represent the physical dimensions of the image area element, e.g. width and length coordinates. The Z axis represents the saturation level between 0 and 1 (corresponding to saturation levels between 0 and 100%). Therefore, fold template 1100 shows the predicted saturation level for each coordinate of in an image area element showing a fold or fold segment. Since a fold or fold segment in an image area element may exist in any direction, the analysis for identification of a fold may include correlation attempts between fold template 1100 and the image area element in several directions. For example, in some embodiments of the present invention, for each analyzed image area element, correlation attempt are executed in every 22.5 degrees of rotation from 0 to 180 degrees, e.g., in 8 different directions, while symmetry of the fold template is taken into account. These directions and number of directions of correlation attempts suffice for high detection rate of folds while keeping a short processing time. However, other attempt directions and/or number of attempt directions are possible.

Figure 12:
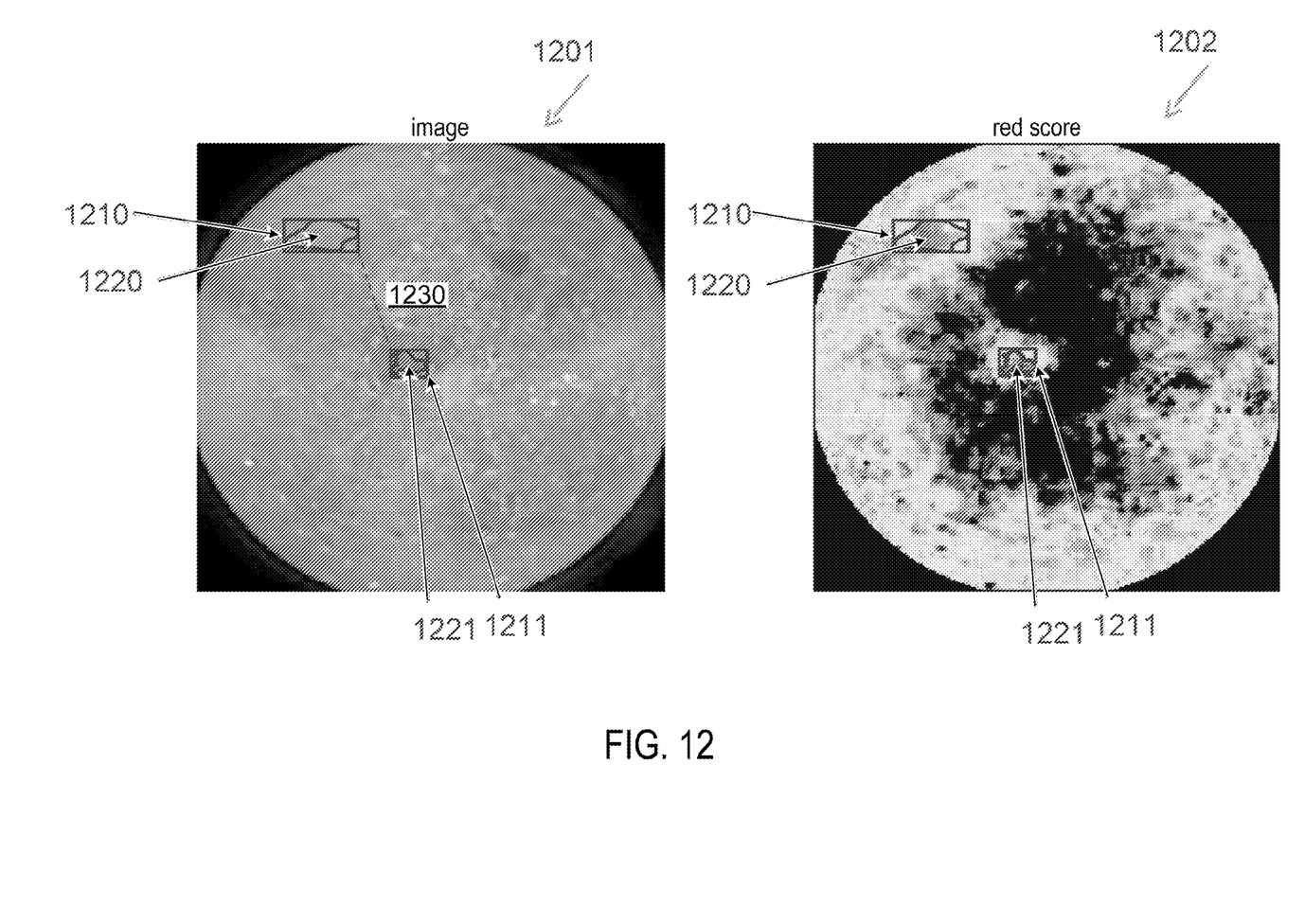
FIG. 12 is an image captured in vivo and a red criterion representation of the same image, processed according to embodiments of the present invention.

Reference is now made to FIG. 12, which includes an image 1201 captured in vivo and a red criterion representation 1202 of the same image, processed according to embodiments of the present invention. Two candidate pathology regions 1220 and 1221 are shown in the image 1201 and in the red criterion representation 1202. According to embodiments of the invention, a distance between the candidate pathology regions 1220 and 1221 may be calculated ort estimated. The estimated distance may provide a distance score for a candidate pathology region, which may increase or decrease the probability that the candidate is indeed a pathology.

Bounding shapes may be generated or calculated for each candidate pathology region. The bounding shape may be generated such that the border of the bounding shape may be touching the border of a candidate pathology region (1220 or 1221) or aligned with it. In one example, bounding boxes may be generated for each candidate pathology region, for example bounding box 1210 which borders candidate pathology region 1221 and bounding box 1211 which borders candidate pathology region 1221. Other bounding shapes may be selected, e.g. oval or circular. Typically, the border of the bounding shape may be touching a border of the candidate pathology region in at least two points. Determining bounding shapes may allow simpler distance estimation between candidate pathology regions. For example, the distance between two bounding boxes may be determined as a distance between the closest corners if the boxes are diagonal to each other, or as a distance between the closest sides if the boxes are positioned in overlapping rows or columns of image pixels. Other methods of estimating a distance between two candidate pathology regions may be used.

Line 1230 is an example of an estimated distance between candidate pathology regions 1220 and 1221, calculated based on bounding boxes 1210 and 1211. In some embodiments, a large (or relatively large) estimated distance between candidate pathology regions may indicate increased probability that the candidates are pathologies, while a small (or relatively small) estimated distance between candidate pathology regions may indicate reduced probability that the candidates are pathologies. The distance or estimated distance between candidate pathology regions may be used as a feature when calculating a score (e.g. a probability score) of an image to depict a pathology.

Figure 13:
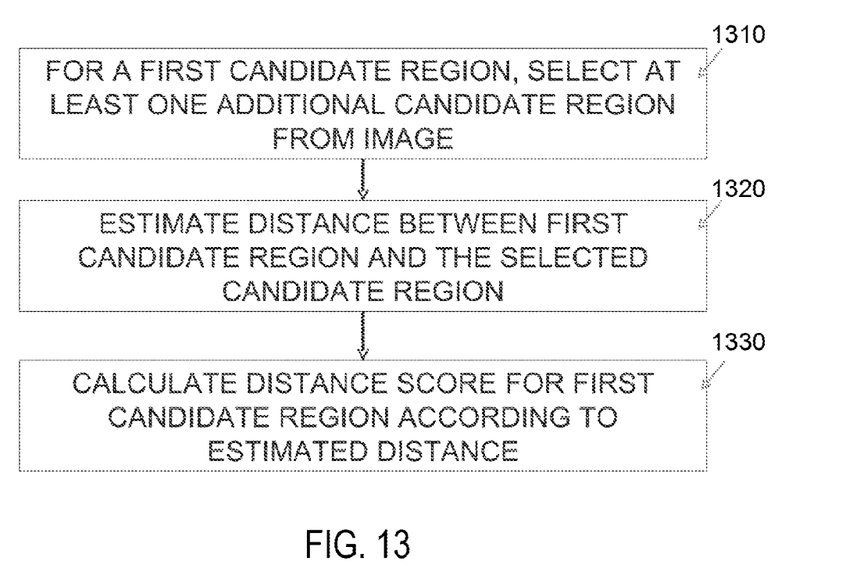
FIG. 13 is a flowchart illustrating a method for determining a distance score for a candidate region in an image according to embodiments of the present invention.

Reference is now made to FIG. 13, which is a flowchart illustrating a method for determining a distance score for a candidate region in an image according to embodiments of the present invention. A distance score for a candidate region in an image may indicate a relative and/or absolute Euclidean distance of the selected candidate region from other suspected pathology regions in the same image. In operation 1310, a first candidate region may be determined in an image for calculating a distance score, and at least one additional candidate region may be selected from the image. Selection of an additional candidate region may be according to one or more selection criteria. For example, in some embodiments, only candidate regions which are of a minimal area (e.g. a minimal number of pixels from the image) may be eligible for selection. Other criteria may be used for selecting the additional candidate regions, for example, only candidate regions which are not too small relative to the first candidate region may be selected. In some embodiments, combinations of absolute and relative criteria may be used for selecting additional candidate regions from the image.

In operation 1320, a distance between the first candidate region and the selected candidate region may be estimated or determined Different methods may be used for estimating or determining the distance. In one example, a bounding geometrical shape may be used, e.g. as described in FIG. 12 hereinabove. The border of the bounding geometrical shape may be determined for the first candidate region and for the selected candidate region, and a distance between the closest points on the borders of the bounding shapes may be calculated. Other methods of distance estimation between two regions of an image may be used.

The distance estimation operation 1320 may be repeated several times, e.g. in one embodiment a distance may be calculated between the first candidate region to each additional candidate region in the image. In other embodiments, only candidate regions which are selected according to pre-determined criteria may be used for distance calculation. Thus, one or more distance estimations (or calculations) may be produced for a single candidate region.

In operation 1330, a distance score may be determined for the first candidate region, based on the distance estimations calculated in operation 1320. In one example, the minimal distance estimation may be selected from the set of distance estimations calculated for the first candidate region, and may be used as the distance score for the first candidate region. In other embodiments, a linear combination of the distance estimations or an average of the distance estimations may be determined as the distance score for the first candidate region. Other formulas may be used, e.g. non-linear combinations of the distance estimations per candidate region, or a maximum of the distance estimations.

A distance score may be calculated for one or more candidate pathology regions in an image, and for one or more images from an image stream.

Based on the features described and possible other features, the probability of pathology of the candidate regions may be estimated, based on which the existence in an image of a candidate region with high probability of pathology may be determined, as described in detail above.

It will be appreciate that in some embodiments of the present invention, candidate regions which include red-brown colors or which are partially red, such as, for example, candidate regions which include dark and/or clotted blood may also be identified.

Additionally, it will be appreciated that in some embodiments of the present invention, all or some of the operations mentioned above, such as, for example, identification of candidate pathology regions, identification of features, evaluation of features, classification, scoring, etc., may be executed by other mathematical methods than the methods mentioned above. For example, in some embodiments of the present invention, all or some of the operations mentioned above may be merged to an optimization problem which may be solved, for example, by known computational tools.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for identification of red pathologies in in-vivo images, the method comprising:
receiving an image captured in-vivo;
identifying candidate pathology regions in the image by identifying red regions in the image;
identifying one or more features indicative of the probability of pathology in said candidate regions by applying on the image a set of analyses, each analysis for identifying a feature indicative of the probability of pathology, wherein said set of analyses comprises at least one analysis for identifying a physical feature causing false identification of apparent red regions in the image, and identification of said feature in positional relation to a candidate region in the image is indicative of low probability of pathology depicted by said candidate, wherein said physical feature is a bubble, and said at least one analysis comprises identifying whiteness features in the perimeter of a candidate region; and
calculating an image score for said image based on said one or more identified features, said image score indicative of existence in the image of at least one candidate region with high probability of pathology, wherein calculating an image score comprises calculating a candidate score for at least one identified candidate region based on said features, said candidate score indicative of the probability of pathology being imaged in said candidate region, wherein said image score corresponds to the candidate score of the candidate region with the highest probability of pathology in the image.

2. The method according to claim 1, wherein said identification of red regions is according to a red criterion value in image area elements, said red criterion value is determined according to location of color of an image area element in a color space relative to pre-calculated border in said color space, said border distinguishing between a red portion and a non-red portion of said color space, wherein the distance of said color from said border corresponds to said red criterion value.

3. The method according to claim 2, wherein said identification of candidate pathology regions comprises selection of identified red regions according to multiple thresholds of red criterion values applied on the image.

4. The method according to claim 2, wherein said set of analyses comprises an analysis for identifying absolute and relative mean red criteria features, said analysis comprising calculating an interior mean red criterion value within a candidate region, a surrounding mean red criterion value in immediate surroundings of said candidate region and an external mean red criterion value in the image outside the candidate region, and comparing the interior mean red criterion value to the surrounding mean red criterion value and to the external mean red criterion value.

5. The method according to claim 2, wherein said set of analyses comprises a calculation of standard deviation of red criterion value within a candidate region.

6. The method according to claim 1, wherein said identification of whiteness features comprises assigning whiteness criterion values to area elements of the image, wherein the whiteness criterion value for an area element of the image is determined according to a color brightness value and differences between color components within the area element of the image.

7. The method according to claim 6, wherein said at least one analysis comprises calculating the median whiteness criterion value and the $95^{th}$ percentile whiteness criterion value in the perimeter of a candidate region.

8. A method for identification of red pathologies in in-vivo images, the method comprising:
receiving an image captured in-vivo;
identifying candidate pathology regions in the image by identifying red regions in the image;
identifying one or more features indicative of the probability of pathology in said candidate regions by applying on the image a set of analyses, each analysis for identifying a feature indicative of the probability of pathology, wherein identifying one or more features comprises calculating a distance score for at least a first candidate region by estimating a distance between the first candidate region and at least one additional candidate region in the image; and
calculating an image score for said image based on said one or more identified features, said image score indicative of existence in the image of at least one candidate region with high probability of pathology, wherein calculating an image score comprises calculating a candidate score for at least one identified candidate region based on said features, said candidate score indicative of the probability of pathology being imaged in said candidate region, wherein said image score corresponds to the candidate score of the candidate region with the highest probability of pathology in the image.

9. A method for identification of red pathologies in in-vivo images, the method comprising:
receiving an image captured in-vivo;
identifying candidate pathology regions in the image by identifying red regions in the image;
identifying one or more features indicative of the probability of pathology in said candidate regions by applying on the image a set of analyses, each analysis for identifying a feature indicative of the probability of pathology, wherein said set of analyses comprises at least one analysis for identifying a physical feature causing false identification of apparent red regions in the image, and identification of said feature in positional relation to a candidate region in the image is indicative of low probability of pathology depicted by said candidate, wherein said physical feature is a fold in an in vivo tissue, and wherein said at least one analysis comprises identifying correlation of color saturation distribution within the candidate region; and
calculating an image score for said image based on said one or more identified features, said image score indicative of existence in the image of at least one candidate region with high probability of pathology, wherein calculating an image score comprises calculating a candidate score for at least one identified candidate region based on said features, said candidate score indicative of the probability of pathology being imaged in said candidate region, wherein said image score corresponds to the candidate score of the candidate region with the highest probability of pathology in the image.

10. The method according to claim 1, wherein calculating said candidate score is performed by assigning a feature value for each identified feature in relation to said candidate region and calculating a vector of values for said identified features in a multidimensional space, each dimension represents an identified feature, wherein said candidate score is determined according to position of said vector in said multidimensional space relative to pre-calculated border in said multidimensional space, said border distinguishing between pathological portion and non-pathological portion of said space, wherein the distance of said vector from said border corresponds to said candidate score.

11. The method according to claim 1, wherein said set of analyses comprises an analysis of shape of a candidate region for determining the similarity of said shape to an ellipse and the degree of oblongness of said shape.

12. A system for identification of red pathologies in in vivo images, the system comprising:
a memory storing in-vivo images; and
a processor to:
identify candidate pathology regions by identifying red regions in an image captured in vivo;
identify one or more features indicative of the probability of pathology in said candidate regions by applying on the image a set of analyses, each analysis for identifying a feature indicative of the probability of pathology, wherein identifying one or more features comprises calculating a distance score for at least a first candidate region by estimating a distance between the first candidate region and at least one additional candidate region in the image;
calculate a candidate score for one or more identified candidate region based on said features, said candidate score indicative of the probability of pathology being imaged in said candidate region; and
calculate an image score for said image based on said one or more identified features, said image score indicative of existence in the image of at least one candidate region with high probability of pathology, wherein said image score corresponds to the candidate score of the candidate region with the highest probability of pathology in the image.

13. The system according to claim 12, wherein the processor is to identify a physical feature causing false identification of apparent red regions in the image, and wherein identification of said feature in positional relation to a candidate region in the image is indicative of low probability of pathology of said candidate.

14. The system according to claim 12, wherein the processor is to determine a red criterion value in image area elements, said red criterion value is determined according to location of color of an image area element in a color space relative to pre-calculated border in said color space, said border distinguishing between a red portion and a non-red portion of said color space, wherein the distance of said color from said border corresponds to said red criterion value.

15. The system according to claim 14, wherein the processor is to perform analysis for identifying absolute and relative mean red criteria features, said analysis comprising calculating an interior mean red criterion value within a candidate region, a surrounding mean red criterion value in immediate surroundings of said candidate region and an external mean red criterion value in the image outside the candidate region, and comparing the interior mean red criterion value to the surrounding mean red criterion value and to the external mean red criterion value.

16. The system according to claim 12, wherein the processor is to identify whiteness features in the perimeter of a candidate region.

17. The system according to claim 13, wherein the processor is to identify a tissue fold within a candidate region.

18. The method according to claim 9, wherein said at least one analysis comprises identifying within a candidate region color brightness values below a certain threshold, and said identifying correlation of color saturation distribution within the candidate region is with a predetermined fold template.

19. The method according to claim 1, wherein identifying one or more features comprises calculating a distance score for at least a first candidate region by estimating a distance between the first candidate region and at least one additional candidate region in the image.

20. A system for identification of red pathologies in in vivo images, the system comprising:
a memory storing in-vivo images; and
a processor to:
receive an image captured in-vivo;
identify candidate pathology regions in the image by identifying red regions in the image;
identify one or more features indicative of the probability of pathology in said candidate regions by applying on the image a set of analyses, each analysis for identifying a feature indicative of the probability of pathology, wherein said set of analyses comprises at least one analysis for identifying a physical feature causing false identification of apparent red regions in the image, and identification of said feature in positional relation to a candidate region in the image is indicative of low probability of pathology depicted by said candidate, wherein said physical feature is a bubble, and said at least one analysis comprises identifying whiteness features in the perimeter of a candidate region; and
calculate an image score for said image based on said one or more identified features, said image score indicative of existence in the image of at least one candidate region with high probability of pathology, wherein calculating an image score comprises calculating a candidate score for at least one identified candidate region based on said features, said candidate score indicative of the probability of pathology being imaged in said candidate region, wherein said image score corresponds to the candidate score of the candidate region with the highest probability of pathology in the image.

21. A system for identification of red pathologies in in vivo images, the system comprising:
a memory storing in-vivo images; and
a processor to:
receive an image captured in-vivo;
identify candidate pathology regions in the image by identifying red regions in the image;
identify one or more features indicative of the probability of pathology in said candidate regions by applying on the image a set of analyses, each analysis for identifying a feature indicative of the probability of pathology, wherein said set of analyses comprises at least one analysis for identifying a physical feature causing false identification of apparent red regions in the image, and identification of said feature in positional relation to a candidate region in the image is indicative of low probability of pathology depicted by said candidate, wherein said physical feature is a fold in an in vivo tissue, and wherein said at least one analysis comprises identifying correlation of color saturation distribution within the candidate region; and
calculating an image score for said image based on said one or more identified features, said image score indicative of existence in the image of at least one candidate region with high probability of pathology, wherein calculating an image score comprises calculating a candidate score for at least one identified candidate region based on said features, said candidate score indicative of the probability of pathology being imaged in said candidate region, wherein said image score corresponds to the candidate score of the candidate region with the highest probability of pathology in the image.

* * * * *